US006122235A

United States Patent [19]
Arai

[11] Patent Number: 6,122,235
[45] Date of Patent: Sep. 19, 2000

[54] METHOD OF READING DATA OUT OF A DISK WITH REDUCING THE NUMBER OF RETRIES

[75] Inventor: Toru Arai, Tokyo, Japan

[73] Assignee: NEC Corporation, Tokyo, Japan

[21] Appl. No.: 09/137,820

[22] Filed: Aug. 21, 1998

[30] Foreign Application Priority Data

Aug. 21, 1997 [JP] Japan ................................. 9-225367

[51] Int. Cl.$^7$ ....................................................... G11B 7/00
[52] U.S. Cl. ................................ 369/54; 369/58; 369/47
[58] Field of Search .................................. 369/47, 48, 49, 369/50, 54, 58, 59, 275.3; 360/39, 48, 51, 53

[56] References Cited

U.S. PATENT DOCUMENTS

| 5,684,765 | 11/1997 | Matsumoto et al. | 369/54 X |
| 5,999,506 | 12/1999 | Shoji et al. | 369/54 X |
| 6,032,276 | 2/2000 | Tomishima | 369/50 X |

FOREIGN PATENT DOCUMENTS

| 57-30112 | 2/1982 | Japan . |
| 4-358360 | 12/1992 | Japan . |
| 5-189876 | 7/1993 | Japan . |
| 6-139718 | 5/1994 | Japan . |
| 7-57400 | 3/1995 | Japan . |
| 7-65313 | 3/1995 | Japan . |
| 8203219 | 9/1996 | Japan . |

*Primary Examiner*—Muhammad Edun
*Attorney, Agent, or Firm*—Foley & Lardner

[57] ABSTRACT

A method is for executing a read retry process to reread data out of a data recording medium when a read error occurs on reading the data out of the data recording medium in accordance with a read address. A host computer detects whether or not a previous retry exists in concern to the read address. The host computer executes a read retry in accordance with a predetermined one of first through N-th retry parameters when the previous retry does not exist in concern to the read address, where N represents a positive integer which is greater than one. The host computer executes a read retry in accordance with a specific one of the first through the N-th retry parameters that is selected on the basis of a predetermined order, when the previous retry exists in concern to the read address. The host computer produces the number of read retry successes in connection to each of the first through the N-th retry parameters. The host computer interchanges the predetermined order into a changed order which has the first through the N-th retry parameters arranged in order of the number of successes. The changed order is used as the predetermined order.

7 Claims, 4 Drawing Sheets

|   | RETRY ADDRESS | READ PARAMATER |
|---|---|---|
| 1 |   |   |
| 2 |   |   |
| 3 |   |   |
| 4 |   |   |
| 5 |   |   |
| ⋮ | ⋮ | ⋮ |
| N |   |   |

FIG. 4

| RETRY ORDER | READ PARAMETER | THE NUMBER OF SUCCESSES |
|---|---|---|
| 1 |   |   |
| 2 |   |   |
| 3 |   |   |
| 4 |   |   |
| 5 |   |   |
| ⋮ | ⋮ | ⋮ |
| N |   |   |

FIG. 5

METHOD OF READING DATA OUT OF A DISK WITH REDUCING THE NUMBER OF RETRIES

BACKGROUND OF THE INVENTION

This invention relates to a method of reading data out of a data storage medium such as an optical disk. In addition, this invention relates to a recording medium for storing a procedure of the reading method.

In general, an optical disk device is known as a reading device for reading data out of a disk. On reading stored data as read data out of an optical disk medium for storing modulated data as the stored data, the optical disk medium is supplied to the optical disk device. More particularly, the optical disk device reproduce the stored data as the read data to transfer the read data to a host computer. As a result, it is possible to use the optical disk device as a data storage device for a personal computer.

By the way, a read error may occur on reading the stored data out of optical disk medium by the optical disk device. More specifically, the optical disk medium has a plurality of sectors each of which defines an unit of a storage region. Each of the sectors has a DATA-SYNC portion which is for use in determining a synchronism of reading data. When a specific one of the sectors has an extrinsic defect or a microscopic dust, the read error occurs in the specific sector on reading the stored data out of the specific sector.

In order to circumvent such a read error, read retry processing is known as a conventional read retry processing which is disclosed in Japanese Unexamined Patent Publication Tokkai Hei 5-189876 (189876/1993) or Japanese Unexamined Patent Publication Tokkai Hei 6-139718 (139718/1994). It will be assumed that a specific one of read parameters is used on reading the stored data out of the specific sector. When the read error occurs in the specific sector, a first one of read parameters is used as a varied read parameter instead of the specific read parameter in the conventional read retry processing. When the read error again occurs in the specific sector on using the first read parameter, a second one of the read parameters is used as the varied read parameter in the conventional read retry processing. The conventional read retry processing makes the varied parameter be varied until the read error does not occur in the specific sector.

As described above, it is necessary to continue the read retry processing until the read error does not occur in the specific sector. More particularly, it is necessary to change or modify the read parameter in the conventional retry processing until the read error does not occur in the specific sector. Accordingly, it takes a long time duration to finish the retry processing, inasmuch as the retry processing is repeated until the read error does not occur in the specific sector.

SUMMARY OF THE INVENTION

It is therefore an object of this invention to provide a method of reading data out of a disk with reducing the number of retries.

Other objects of this invention will become clear as the description proceeds.

On describing the gist of this invention, it is possible to understand that a method is for executing a read retry process to reread data out of a data recording medium when a read error occurs on reading the data out of the data recording medium in accordance with a read address.

According to a first aspect of this invention, the method comprises the steps of (A) detecting whether or not a previous retry exists in concern to said read address, (B) executing a read retry in accordance with a predetermined one of first through N-th retry parameters when the previous retry does not exist in concern to the read address, where N represents a positive integer which is greater than one, executing a read retry in accordance with a specific one of the first through the N-th retry parameters that is selected on the basis of a predetermined order, when the previous retry exists in concern to the read address, (C) producing the number of read retry successes in connection to each of the first through the N-th retry parameters, and (D) interchanging the predetermined order into a changed order which has the first through the N-th retry parameters arranged in order of the number of successes, the changed order being used as the predetermined order.

According to a second aspect of this invention, there is provided a read retry apparatus for executing a read retry process to reread data out of a data recording medium when a read error occurs on reading said data out of the data recording medium in accordance with a read address. The read retry apparatus comprises (A) first means for detecting whether or not a previous retry exists in concern to the read address, (B) second means for executing a read retry in accordance with a predetermined one of first through N-th retry parameters when the previous retry does not exist in concern to the read address, where N represents a positive integer which is greater than one, the second means executing a read retry in accordance with a specific one of the first through the N-th retry parameters that is selected on the basis of a predetermined order when the previous retry exists in concern to the read address, (C) third means for producing the number of read retry successes in connection to each of the first through the N-th retry parameters, and (D) fourth means for interchanging the predetermined order into a changed order which has the first through the N-th retry parameters arranged in order of the number of successes, the changed order being used as the predetermined order.

According to a third aspect of this invention, there is provided a medium for recording a method of executing a read retry process to reread data out of a data recording medium when a read error occurs on reading the data out of the data recording medium in accordance with a read address. The method comprises the steps of (A) detecting whether or not a previous retry exists in concern to said read address, (B) executing a read retry in accordance with a predetermined one of first through N-th retry parameters when the previous retry does not exist in concern to the read address, where N represents a positive integer which is greater than one, executing a read retry in accordance with a specific one of the first through the N-th retry parameters that is selected on the basis of a predetermined order, when the previous retry exists in concern to the read address, (C) producing the number of read retry successes in connection to each of the first through the N-th retry parameters, and (D) interchanging the predetermined order into a changed order which has the first through the N-th retry parameters arranged in order of the number of successes, the changed order being used as the predetermined order.

BRIEF DESCRIPTION OF THE DRAWINGS

FIG. 4 shows a view for illustrating a retry address list used in the computer system illustrated in FIG. 2; and FIG. 5 shows a view for illustrating a parameter table used in the computer system illustrated in FIG. 2.

DESCRIPTION OF THE PREFERRED EMBODIMENT

Figure 1:
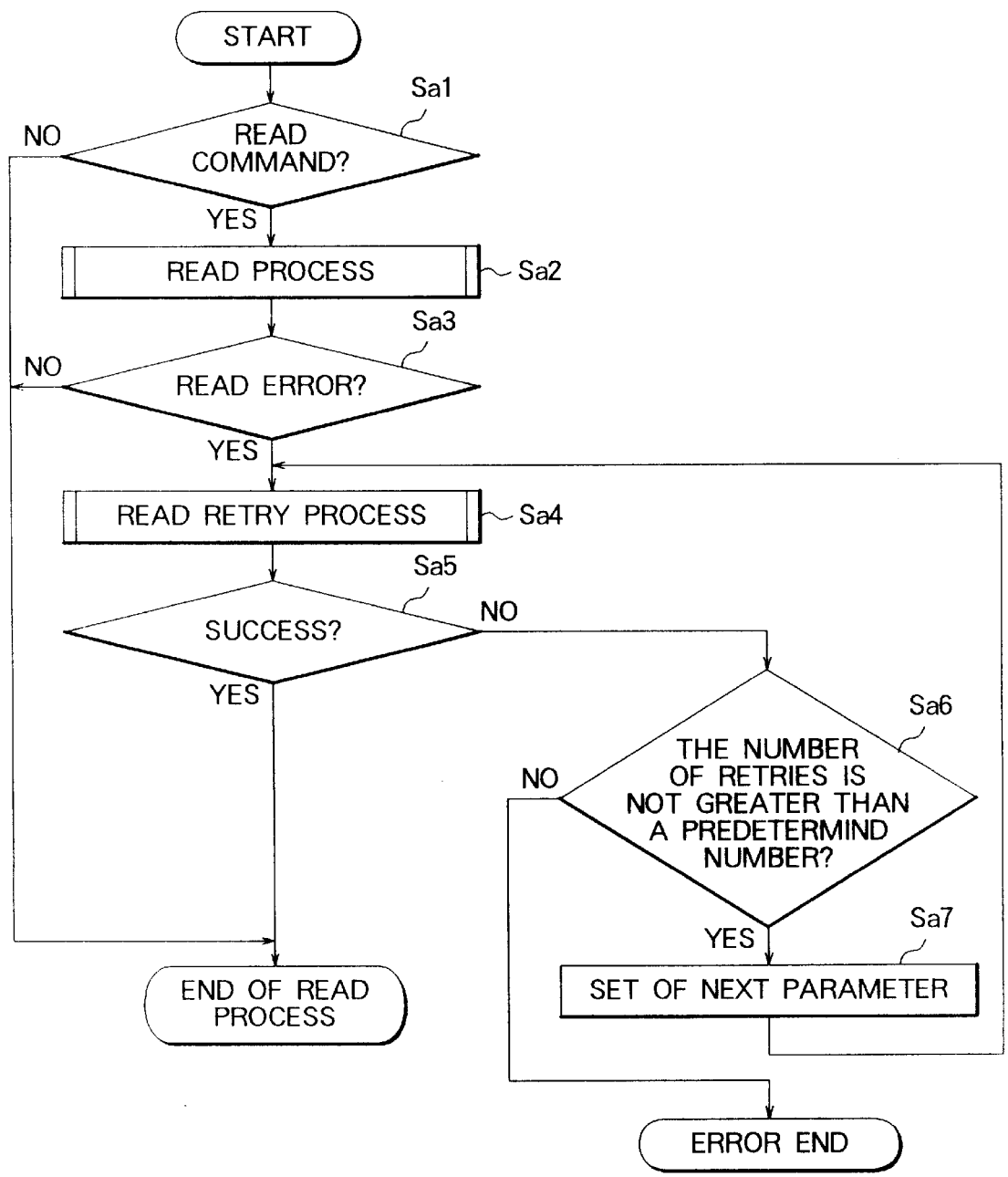
FIG. 1 is a flowchart for describing a read retry processing in a conventional art optical disk device.

Referring to FIG. 1, a conventional reading method will be described at first in order to facilitate an understanding of this invention. A read command is monitored at a first step Sa1. When no read command is entered, a read process proceeds to an end. When the read command is entered at the first step Sa1, the read process is carried out in order to read data out of a medium such as a disk at a second step Sa2. A monitor is carried out at a third step Sa3 in order to detect whether or not a read error occurs during the above-mentioned read process.

First through N-th read retry parameters are provided in an ascending order, where N represents a positive integer which is not less than one. When the read error is detected in the reading process at third step Sa3, a read retry process is executed by the first read retry parameter at a fourth step Sa4. Judgement is made as regards whether or not the read retry process succeeds in performance at a fifth step SaS. When the read retry process does not succeed in performance, Judgement is made as regards whether or not the number of read retries is greater than a predetermined number at a sixth step Sa6. When the number of read retries is not greater than the predetermined number at the sixth step Sa6, a second read retry parameter is used in the read retry process instead of the first read retry parameter at a seventh step Sa7. The seventh step Sa7 is followed by the fourth step Sa4 in order to again execute the read retry process. When the number of read retries is not greater than the predetermined number at the sixth step Sa6, the read retry process ends in the read error. When the read retry process succeeds in performance at the fifth step Sa5, the read retry process ends.

As readily understood from the above description, it is necessary to continue the read retry process until the read error does not occur in the specific sector. More particularly, it is necessary to change or modify the read parameter in the conventional retry processing until the read error does not occur in the specific sector. Accordingly, it takes a long time duration to finish the retry process, inasmuch as the retry process is repeated until the read error does not occur in the specific sector.

Figure 2:
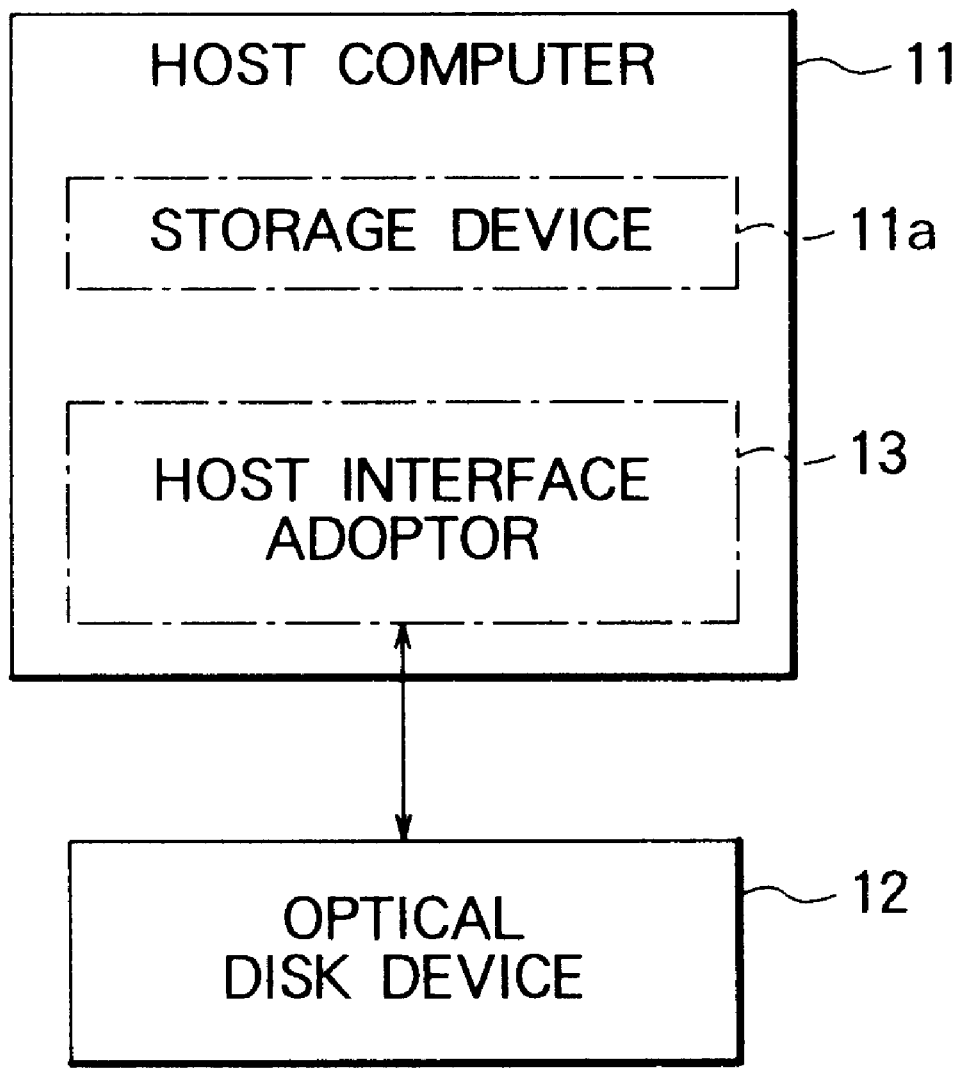
FIG. 2 is a block diagram for illustrating a computer system having an optical disk device that uses a reading method according a preferred embodiment of this invention.

Referring to FIG. 2, description will proceed to a reading method according to a preferred embodiment of this invention. The reading method is used in a computer system in illustrated in FIG. 2. In FIG. 2, the computer system comprises a host computer 11 and an optical disk device 12. The host computer 11 comprises a storage device 11a and a host interface adapter 13. The storage device 11a stores a program describing a process procedure. The storage device 11a further stores initial data, addresses, and parameters all of which will be described later. In the example being illustrated, the storage device 11a may be a semiconductor memory device such as a random access memory (RAM) and a read-only memory (ROM). Furthermore, the storage device 11a may be a storage medium such as a magnetic disk. The optical disk device 12 is connected to the host computer 11 through the host interface adapter 13 to transmit and receive commands and data.

Figure 3:
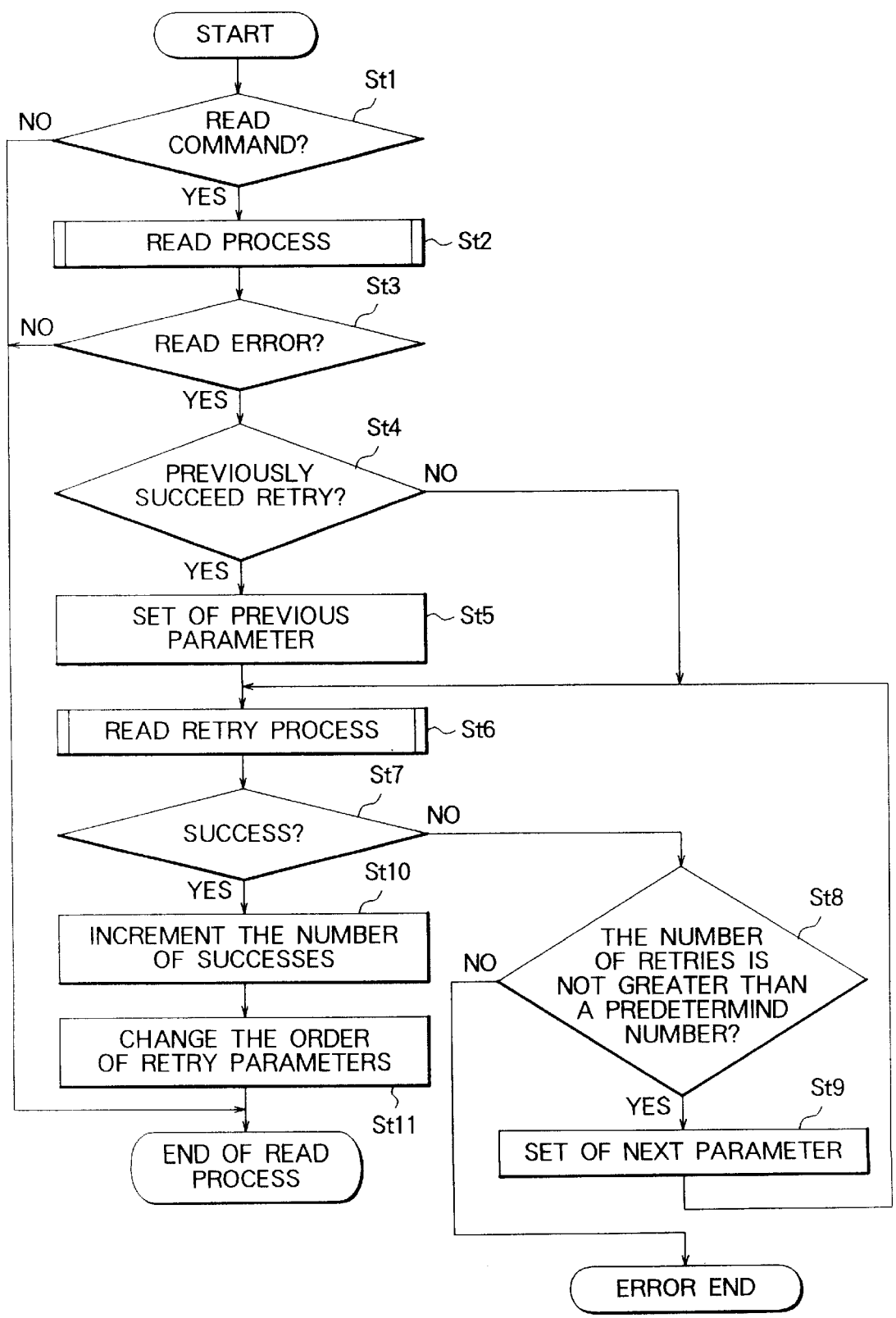
FIG. 3 is a flowchart for describing a reading process in the computer system illustrated in FIG. 2.

Referring to FIG. 3 in addition to FIG. 2, the host computer 11 monitors whether or not a read command is entered into the optical disk device 12 at a first step St1 on a read process. The read command has a read address. When the read command is not entered into the optical disk device 12, the read process ends. When the read command is entered into the optical disk device 12, the host computer 11 carries out the read process to read data out of the optical disk device 12 at a second step step St2.

During the read process, the host computer 11 monitors whether or not whether a read error occurs in the read process at a third step St3. In case where the read error occurs in the read process, the host computer 11 refers a retry address list memorized in the storage device 11a at a fourth step St4, in order to judge whether a read retry process has ever succeeded at the read address.

Referring to FIG. 4, the retry address list is memorized in the storage device 11a. More particularly, the read address and the read retry parameter is registered as a retry address and a read parameter in the retry address list when the read retry process succeeds, even if the read error occurs on reading data out of the optical disk device 12. In the example being illustrated, the retry address list has first through N-th retry addresses and first through N-th read parameters. The first through the N-th retry addresses corresponds to the first through N-th read parameters, respectively. The first and the N-th retry addresses are sorted or rearranged in ascending or descending order, in order to readily judge whether or not the retry address is present on searching for the retry address list. In addition, it is further easy to search for the retry address list when the first through the N-th retry addresses are grouped into zones, respectively.

Again referring to FIG. 3, it will be assumed that the retry address list has a history which is representative of success of retry in a previous retry process, on searching for the retry address list at the fourth step St4. Out of the retry address list, the host computer 11 reads a specific one of the first through the N-th read parameters that is a parameter of retry success at a fifth step St5, in order to use the specific read parameter as an initial retry parameter. The host computer 11 executes a retry process on the basis of the initial retry parameter at a sixth step St6. The host computer 11 judges whether or not the retry process succeeds at a seventh step St7. When the retry process does not succeed, the host computer judges whether or not the number of the read retry processes is greater than a predetermined retry number at an eighth step St8. When the number of the read retry processes is not greater than the predetermined retry number at the eighth step St8, the host computer reads a next read parameter out of the retry address list at a ninth step St9 in order to use the next read parameter as a next retry parameter. The next read parameter is another one of the first through the N-th read parameters that is a parameter of retry success. The ninth step St9 is followed by the sixth step St6 in order to repeat the read retry process. On the other hand, the read retry process ends as a read error when the number of the read retry processes is greater than the predetermined retry number at the eighth step St8.

Referring to FIG. 5, a parameter table is memorized in the storage device 11a. More particularly, a retry order and the number of successes are registered in the parameter table in correspondence to each of the first through the N-th read parameters. On executing the read retry process, the host computer 11 refers the parameter table to use one of the first through the N-th read parameter that corresponds to the retry order in accordance with the number of retries.

When the host computer 11 judges that the read retry process succeeds in performance at the seventh step St7, the host computer 11 adds one to the number of successes in connection to the read parameter corresponding to success of the read retry process at a tenth step St10. After that, the host computer 11 rearranges the first through the N-th read parameters in the parameter table in accordance with the number of successes at an eleventh step St11. More specifically, the host computer 11 positions, at a top of the parameter table, one of the first through the N-th read parameters that has the greatest number of successes. The host computer 11 positions, at a bottom of the parameter table, another one of the first through the N-th read parameters that has the lowest number of successes. After the eleventh step St11, the host computer ends the read process.

It will be assumed that the read retry process succeeds in performance by the second retry parameter at the seventh step St7. The number of successes is incremented in concern to the second retry parameter at the tenth step St10. The tenth step St10 is followed by the eleventh step St11 at which the first through the N-th retry parameters are rearranged in accordance with the number of successes in connection to retry parameters.

The above-mentioned read retry process may be recorded in a medium such as a disk in order to read the read retry process into a computer system. The computer system executes the read retry process memorized in the medium.

While this invention has thus far been described in conjunction with the preferred embodiments thereof, it will readily be possible for those skilled in the art to put this invention into practice in various other manners.

What is claimed is:

1. A method for executing a read retry process to reread data out of a data recording medium when a read error occurs on reading said data out of said data recording medium in accordance with a read address, comprising the steps of:

detecting whether or not a previous retry exists in concern to said read address;

executing a read retry in accordance with a predetermined one of first through N-th retry parameters when said previous retry does not exist in concern to said read address, where N represents a positive integer which is greater than one, executing a read retry in accordance with a specific one of said first through said N-th retry parameters that is selected on the basis of a predetermined order when said previous retry exists in concern to said read address;

producing the number of read retry successes in connection to each of said first through said N-th retry parameters; and interchanging said predetermined order into a changed order which has said first through said N-th retry parameters arranged in order of the number of successes, said changed order being used as said predetermined order.

2. A read retry apparatus for executing a read retry process to reread data out of a data recording medium when a read error occurs on reading said data out of said data recording medium in accordance with a read address, comprising:

first means for detecting whether or not a previous retry exists in concern to said read address;

second means for executing a read retry in accordance with a predetermined one of first through N-th retry parameters when said previous retry does not exist in concern to said read address, where N represents a positive integer which is greater than one, said second means executing a read retry in accordance with a specific one of said first through said N-th retry parameters that is selected on the basis of a predetermined order when said previous retry exists in concern to said read address;

third means for producing the number of read retry successes in connection to each of said first through said N-th retry parameters; and fourth means for interchanging said predetermined order into a changed order which has said first through said N-th retry parameters arranged in order of the number of successes, said changed order being used as said predetermined order.

3. A read retry apparatus as claimed in claim 2, wherein said data recording medium is an optical disk medium.

4. A read retry apparatus as claimed in claim 2, wherein said read retry apparatus further comprises memory means having a predetermined memory region for memorizing said read address and ones of said first through said N-th retry parameters in pairs.

5. A read retry apparatus as claimed in claim 4, wherein said read retry apparatus further comprises memory means having a prescribed memory region for memorizing each of said first through said N-th retry parameters and the number of read retry successes in pairs.

6. A read retry apparatus as claimed in claim 2, wherein said read retry apparatus further comprises memory means having a prescribed memory region for memorizing each of said first through said N-th retry parameters and the number of read retry successes in pairs.

7. A medium for recording a method of executing a read retry process to reread data out of a data recording medium when a read error occurs on reading said data out of said data recording medium in accordance with a read address, wherein said method comprises the steps of:

detecting whether or not a previous retry exists in concern to said read address;

executing a read retry in accordance with a predetermined one of first through N-th retry parameters when said previous retry does not exist in concern to said read address, where N represents a positive integer which is greater than one, executing a read retry in accordance with a specific one of said first through said N-th retry parameters that is selected on the basis of a predetermined order when said previous retry exists in concern to said read address;

producing the number of read retry successes in connection to each of said first through said N-th retry parameters; and interchanging said predetermined order into a changed order which has said first through said N-th retry parameters arranged in order of the number of successes, said changed order being used as said predetermined order.

* * * * *